March 29, 1949.   F. E. NUSSBERGER   2,465,658
PURIFICATION OF LIQUIDS
Filed Sept. 13, 1944   3 Sheets-Sheet 1
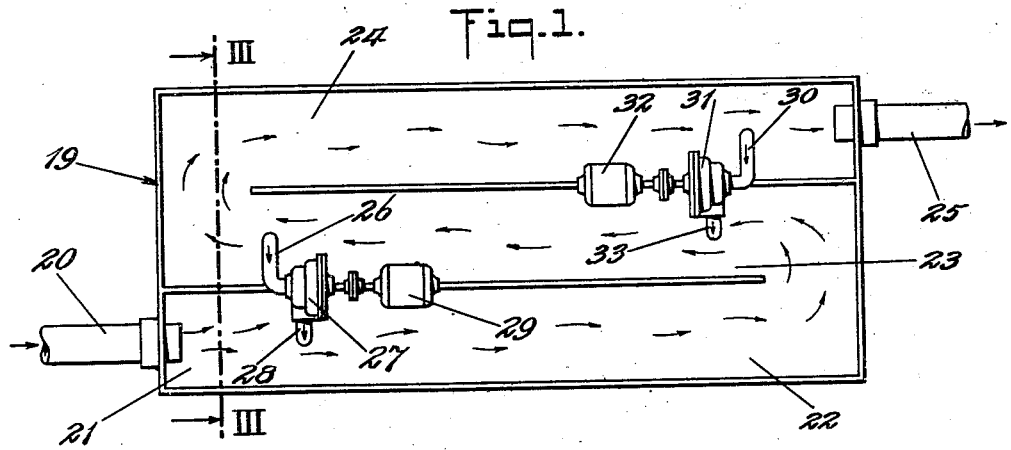
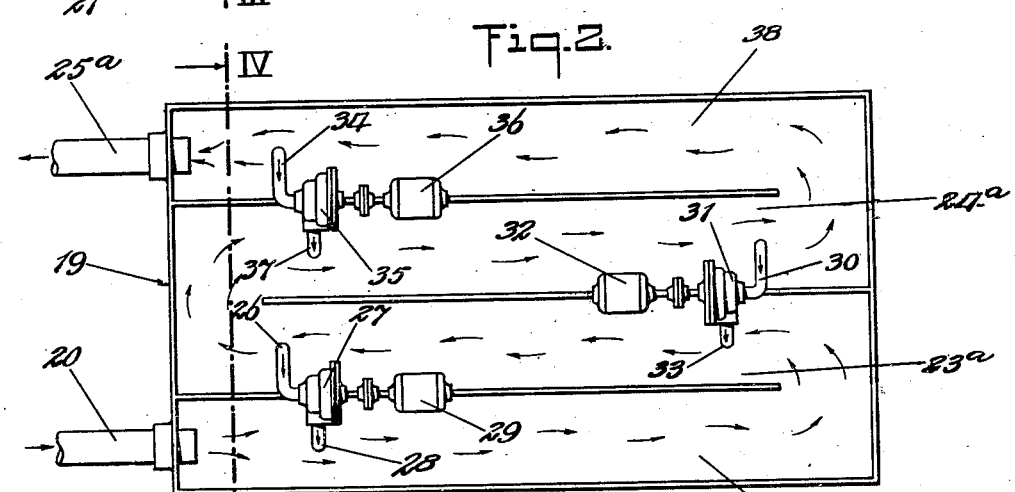
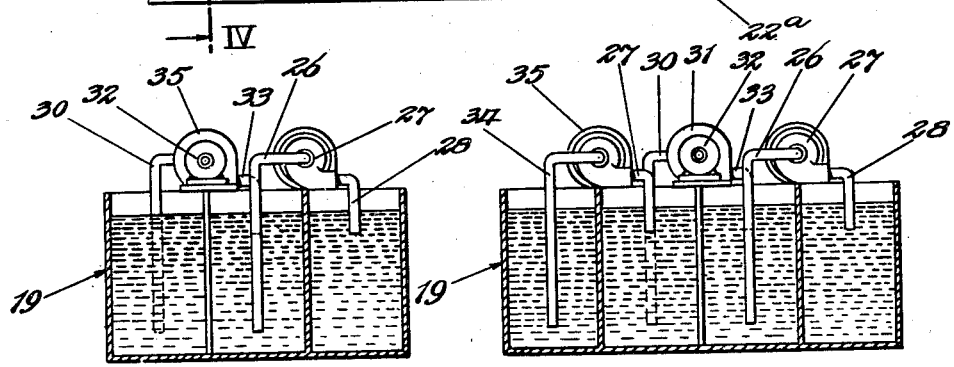
INVENTOR
FREDERICK E. NUSSBERGER
by his attorney

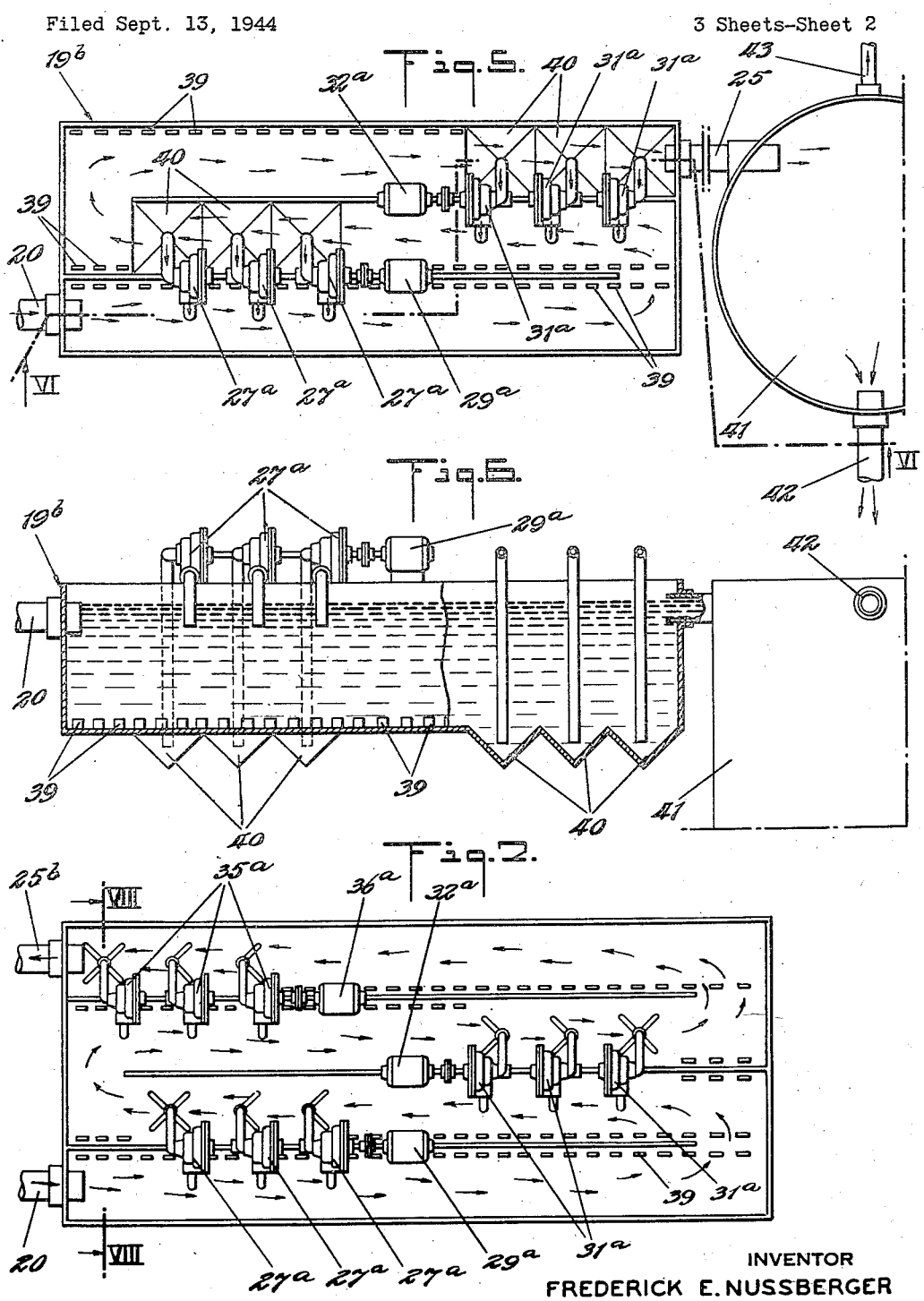

March 29, 1949.　　　F. E. NUSSBERGER　　　2,465,658
PURIFICATION OF LIQUIDS

Filed Sept. 13, 1944　　　3 Sheets-Sheet 3

INVENTOR
FREDERICK E. NUSSBERGER
by his attorney

Patented Mar. 29, 1949

2,465,658

UNITED STATES PATENT OFFICE 2,465,658

PURIFICATION OF LIQUIDS

Frederick E. Nussberger, New York, N. Y.

Application September 13, 1944, Serial No. 553,910

14 Claims. (Cl. 210—8)

My invention relates to the purification of liquid, and more particularly to the purification of liquid while it is flowing in a passage or channel. The invention is especially useful in its application to the purification of sewage by activated sludge to which use, however, it is not limited.

One object of the invention is the provision of a method and an apparatus for purification of liquid which will insure more consistent performance under varying conditions of quality and quantity of liquid than has heretofore been possible. Another object is that of effecting economies in the method and in the size of apparatus required for applying the method. A further object is the provision of better technique in controlling the purification. Other objects and advantages of the invention will be apparent from the present specification, together with the accompanying drawings wherein—

Figure 1 is a semi-diagrammatic view of an apparatus constructed in accordance with the invention;

Fig. 2 is a similar view of another apparatus constructed in accordance with the invention;

Fig. 3 is a cross section taken on the line III—III of Figure 1;

Fig. 4 is a cross section taken on the line IV—IV of Fig. 2;

Fig. 5 is a plan view of another form of the invention;

Fig. 6 is a longitudinal section taken on the line VI—VI of Fig. 5;

Fig. 7 is a plan view of still another form of the invention;

Figure 8:
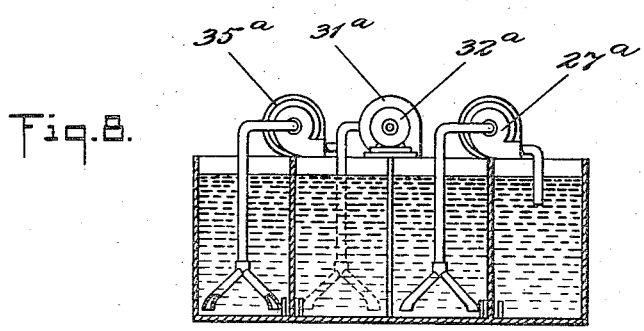
Fig. 8 is a cross-section taken on the line VIII—VIII of Fig. 7.

According to the invention, the liquid is treated by a purifying substance, as it flows in a passage or channel. Some of the purifying substance is subsequently removed from each of a plurality of downstream points in the apparatus and is conveyed to a plurality of corresponding upstream points along the line of liquid flow. There is thus established a series of treatment zones along the treatment passage.

The invention will be particularly described in its application to the purification of sewage by the activated sludge process, but it will be understood that the same principles apply to purification of other liquids as in the treatment of water, industrial waste or the mechanical treatment of sewage.

In the present continuous flow activated sludge process, sewage is purified by contact with an activated floc in the presence of dissolved air. In practice, the activated sludge is collected in a sedimentation tank after the sewage has been purified, and is conveyed from that point to the influent point of the system where the raw sewage enters the apparatus. One of the difficulties encountered in this process is that of maintaining an activated floc with the optimum clarifying ability. An essential difficulty is that when collected in the sedimentation tank, the activated sludge is no longer in an environment of dissolved oxygen, and therefore deteriorates as a biologically active floc.

According to the present invention, activated solids in the required condition and quantity are provided and maintained in the treatment tank by transferring such solids from downstream points to upstream points at intermediate stages of the sewage flow, and no activated sludge is directly returned to the treatment tank from the final sedimentation tank. Thus, many of the difficulties of the standard process are eliminated. The net result of this new principle is that treatment zones are provided in the apparatus wherein the activated sludge is maintained in biological condition to produce the optimum effect upon the sewage in its condition of treatment in each zone.

Referring now more particularly to the forms of the invention illustrated in the drawings, and especially to the embodiment illustrated in Figs. 1 and 3, there is shown a sewage treatment tank 19 of the so-called spiral flow type, sometimes known as an aerating tank. Raw sewage enters the treatment tank 19 from a conduit 20. The conduit 20 discharges the raw sewage into the influent point 21 of the tank 19, whence the sewage passes along an initial channel 22, reversing its direction at the end of this channel, and entering a second or intermediate channel 23. Passing in reverse direction through the channel 23, the sewage again reverses its direction and enters a final channel 24 from which it leaves the treating apparatus through a pipe 25. The tank may be provided with the usual air diffuser plates (not shown in Figs. 1 and 3 but fully illustrated in Figs. 5, 6 and 7 and designated by the reference numeral 39) or with other known or convenient forms for adding air to the sewage. Known or convenient means may also be employed for preventing sedimentation.

To start the process, clarifying solids, as activated sludge, are initially added in known or convenient manner to the sewage shortly after it enters the channel 22. Thereafter the process creates its own clarifying solids or activated sludge. The activated sludge flows with the sewage, purifying the same in well known manner as it progresses through the successive channels. In a quiescent region in the intermediate channel 23, a conduit 26 withdraws activated sludge and partly treated sewage, which passes through a centrifugal pump 27 and is returned to the initial channel 22 through a pipe 28. A motor 29 is shown as operating the centrifugal pump 27. Thus a zone of treatment is provided by the initial channel 22 and the intermediate channel 23, and activated sludge is circulated in this zone and acts upon the sewage in this zone. Because of the condition of the sewage while undergoing this preliminary treatment, this zone is conditioned for the preliminary treatment of the sewage and performs the first step of the purification efficiently. Sludge precipitated from the sewage in this zone becomes activated, and its qualities are those required for the first stage of sewage treatment. Such sludge as is not withdrawn through the conduit 26 passes downstream in the intermediate channel 23.

Similarly, a pipe 30 connecting with a centrifugal pump 31, operated by a motor 32, carries activated sludge and partly treated sewage through a pipe 33 from a quiescent region at a downstream point in the final channel 24 to an upstream point in the intermediate channel 23. Thus, a second zone is provided wherein a second process of purification is effected following that already carried out in the first zone. This second zone is conditioned for a further step in the treatment of the sewage, and floc which is circulated in this zone remains in appropriate condition.

A plurality of zones are accordingly established in the treatment tank 19 which are differentiated according to the location of the zone and also according to the type and culture of the organisms found therein. It will be noted, however, that a portion of the activated floc passes with the sewage from near the influent point 21 to the effluent point of the treatment tank because all of the activated sludge reaching the conduits 26 and 30 is not returned to upstream points through the pipes 28 and 33. It is preferred to discharge the sludge returned from the final channel 24 to a point in the intermediate channel 23 which is upstream with respect to the point therein from which sludge is returned to the initial channel 22. Thus, there will be a continual passage of part of the sludge from the effluent point to the influent point, since some of the activated sludge carried from the downstream end of the channel 24 to the upstream end of the intermediate channel 23 will be picked up by the conduit 26 and deposited near the influent point of the upstream end of the initial channel.

From the foregoing description it will be evident that by operating the motors 29 and 32 together at different rates of speed the rate of circulation of activated sludge may be varied to meet variations in quantity and quality of sewage entering the apparatus. Also the type and concentration of any type of organisms accumulated in any zone is under the control of the operator, since adjusting the relative rates of flow through the separate return pumps will cause activated solids to be withdrawn from one zone and added to another, where they may be held as desired. Thus a compact, flexible and efficient apparatus is provided. Furthermore, while it is possible to construct such apparatus as a long straight passage, the illustrated construction makes possible economy in the length of return pipes, power and passage walls; and additional length of passage may be effected merely by providing an additional channel with one additional vertical wall.

Figs. 2 and 4 illustrate a similar construction wherein a third return pass is provided for the sewage, and a pipe 34, a centrifugal pump 35 operated by a motor 36, and a pipe 37 transfer partly treated sewage and activated sludge to an upstream point in the third channel 24a of the construction. In each case, the activated sludge is removed from a quiescent region near the bottom of the downstream channel to an agitated region near the top of the adjacent upstream channel, and air is added in known or convenient manner to the flowing sewage under treatment.

In the embodiment illustrated in Figs. 5 and 6, there is shown an apparatus like that illustrated in Figs. 1 and 3, wherein air diffuser plates 39 are disposed adjacent walls of the respective channels, except at points near the quiescent regions, from which the activated sludge is returned to upstream points. In this embodiment, activated sludge is returned from hoppers 40 formed like inverted pyramids at the bottom of each quiescent region, and a battery of centrifugal pumps 27a and 31a operated by motors 29a and 32a respectively serve to return the activated sludge from such hoppers to upstream points. This embodiment is especially useful where extreme variations in the rate of flow are to be expected, as it is possible to operate one or more centrifugal pumps in accordance with the rate of sewage flow so that more rapid or less rapid circulation of activated sludge may be effected. Thus, the system is able to operate successfully under sudden shocks of increased sewage flow, since a reserve supply of activated solids is maintained in each cycle and can be called upon by operation of the required number of centrifugal pumps when sudden changes in flow occur.

The number of pumps and their capacity must be such as to return a sufficient quantity of clarifying solids to upstream points in each zone to maintain the optimum treatment condition in each of the respective zones under varying conditions of flow and concentration. Thus the effluent of the tank 19b may be caused to contain a quantity of solids which is substantially equal to the quantity which the tank receives with the raw sewage.

In this embodiment there is shown a final sedimentation tank 41 into which the treated sewage is carried by the pipe 25 from the effluent end of the treatment tank 19b, and in which the solids and clarified liquid are separated by sedimentation at the end of the process. The quantity of solids carried into the final sedimentation tank will be about equal to the quantity of solids which enters the system through the conduit 20. The clarified effluent is withdrawn from the tank 41 through a delivery pipe 42 which may carry the effluent to a convenient body of water. Settled sludge may be withdrawn from the final sedimentation tank 41 through a pipe 43 and delivered to some place of final disposal.

Sludge for use in the process is not removed from the sedimentation tank 41, which may be designed exclusively as a sedimentation tank. This permits economy of design.

As a quantitive statement of how an apparatus such as that illustrated in Figs. 5 and 6 may be operated, the following is given. For an apparatus capable of treating 10 m.g.d. of a usual type of sewage, each of the three channels may be 250 feet long, 30 feet wide and 15 feet deep. Such a tank will provide a detention period of about 6 hours and the average velocity of liquid through the tank will be substantially two feet per minute. The sludge return apparatus may be operated in the manner already described.

The embodiment of the invention illustrated in Figs. 7 and 8 shows a four-channel tank similar to that illustrated in Figs. 2 and 4, but provided with diffuser plates 39 and plural centrifugal pumps, as in the embodiment illustrated in Figs. 5 and 6. The construction shown in Figs. 7 and 8 provides no hoppers but employs multi-ended withdrawal pipes in the quiescent regions in order that the rate at which the activated sludge is withdrawn may not create any appreciable disturbances in the quiescent regions.

Figure 9:
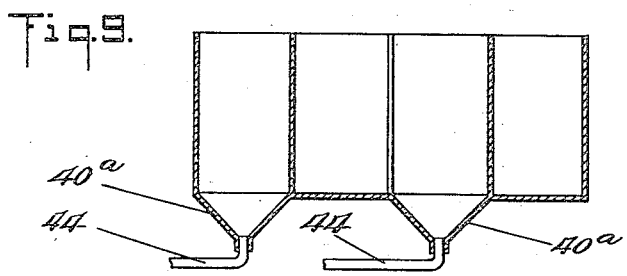
Figs. 9, 10 and 11 illustrate variant forms of the construction shown in Fig. 8.

The apparatus shown in Fig. 9 illustrates an alternate construction of the form of tank disclosed in Figs. 7 and 8, wherein inverted pyramidal or conical hopper bottoms 40a may be provided at the quiescent regions. Pipes 44 are connected to the bottoms of these hopper bottoms for withdrawing part of the sludge collected therein. These pipes may also be used to add initial sludge when the apparatus is started, or to transport activated sludge from a downstream to an upstream point of the tank.

Where, as the result of employing larger quiescent regions or a greater rate of intermediate sludge return, or where other conditions permit, the content of suspended solids at the effluent end of the apparatus is kept sufficiently low, such pipes 44 may be used to withdraw solids from the effluent end for final disposal, and the final sedimentation tank may be eliminated. Other apparatus might obviously be substituted for pipes 44 to accomplish this purpose.

Figure 10:
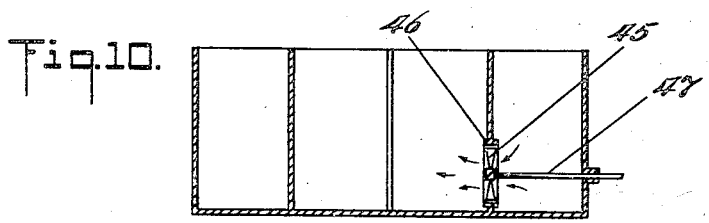

Clearly, it is not necessary to employ the centrifugal pump arrangement shown in Figs. 1 to 8 in order to return activated sludge from downstream to upstream points. Other well-known means may be employed for this purpose. One alternate means is illustrated in Fig. 10, wherein a propeller 45 is positioned in an opening 46 near the bottom of a wall separating two adjacent channels. A shaft 47, extending through an external wall of the treating tank operates the propeller to return partly treated sewage carrying a concentration of sludge to an upstream point in the adjacent channel.

Figure 11:
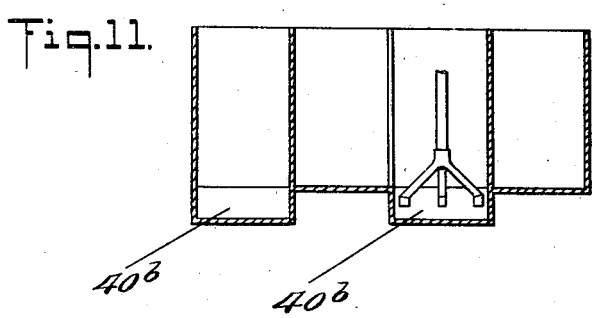

Clearly also, a variety of hopper bottoms may be provided beneath the quiescent point in the passage. For example, a square hopper bottom 40b, such as those illustrated in Fig. 11 may be employed.

From the foregoing, it will be apparent that the present invention provides an apparatus and a method which will give consistent performance under varying quality and quantity of liquid to be purified. It will also be evident that the invention may be applied with ease and economy to existing activated sludge plants, which need not necessarily be scrapped and rebuilt to obtain the advantages of the invention. The apparatus is economical to construct and to operate and the process can be controlled to meet varying demands. The purifying solids are kept fresh and active at all times and in a state of culture according to their position along the line of flow and their distance from the influent end of the tank.

The process herein described is particularly adapted for use with the addition of an iron salt, since the iron will remain in the heavier floc and will not be chemically reduced as might be the case if it were accumulated in a final sedimentation tank in an environment lacking dissolved oxygen.

Although specifically described in connection with its application to the activated sludge process of purification of sewage, the method and the apparatus is applicable to purification of other liquids by other means.

The forms of the invention here particularly described and illustrated are presented merely to indicate how the invention may be applied. Other forms, differing in detail but not in principle from those here set forth, will readily suggest themselves to those skilled in the art.

I claim:

1. A method of purifying liquid comprising introducing the liquid into one end of a channel, withdrawing liquid from the other end of the channel, agitating the liquid, supplying air beneath the surface of the liquid, treating the flowing liquid with purifying solids, returning a part of the purifying solids from a point near the effluent end of the channel to a first upstream point therein, and returning a part of the purifying solids from a point downstream of this first upstream return point to a point still farther upstream with respect to the first upstream return point.

2. A method of purifying liquid comprising introducing the liquid into one end of a channel, withdrawing liquid from the other end of the channel, supplying air beneath the surface of the liquid, treating the flowing liquid with purifying solids, returning a part of the purifying solids from a point near the effluent end of the channel to a first upstream point therein, returning a part of the purifying solids from a point downstream of this first upstream return point to a point still farther upstream with respect to the first upstream return point, and returning other parts of the purifying solids from points downstream of upstream delivery points to points upstream of such delivery points until purifying solids are returned to a point near the influent end of the channel.

3. The improvement in the activated sludge process of treating sewage in an aerating tank of the continuous flow type, said improvement comprising transporting clarifying solids from a point near the effluent end of the tank to a point upstream in the tank, transporting clarifying solids from a point downstream from the point of delivery of the solids withdrawn from near the effluent end of the tank to a point near the influent point of the tank, aerating the sewage and clarifying solids in the tank, discharging an effluent containing solids in amount substantially equal to the solids received in the raw sewage, and separating the solids and clarified liquid at the end of the process.

4. The improvement in the activated sludge process of treating sewage in an aerating tank of the continuous flow type, said improvement comprising supplying air beneath the surface of the sewage, removing a portion of the contents of the tank from a point near the effluent end of the tank, transporting the removed portion to an upstream point in the tank, there returning the removed portion to the sewage flowing in the tank, removing a second portion of the contents of the tank from a point between the above-named removal point and the above-named return point, transporting this second removed portion to a point in the tank which is upstream with respect to the first-named return point, and repeating such removal, transportation and return of portions of the contents of the tank until a portion is returned to the tank at a point near the influent end of the tank.

5. Apparatus for purifying liquid comprising a tank having a long passage therein, means for supplying unpurified liquid and purifying solids to said tank at one end of the passage, means for supplying air beneath the surface of the liquid, means for withdrawing purified liquid and suspended solids from said tank at the other end of the passage, means for withdrawing added purifying solids from a point in the passage and returning these purifying solids to an upstream point in the passage, and other means for withdrawing purifying solids from a point between the withdrawal and return points of said last named means and returning these purifying solids to a point still farther upstream in the passage.

6. Apparatus for purifying liquid comprising a tank, partition means for dividing said tank into continuous flow passages, means for supplying unpurified liquid to the head end of the first passage, means for withdrawing liquid from the outlet end of the last passage, means for transporting purifying solids from a point near the outlet means to a point upstream in the tank, means for transporting purifying solids from a point downstream from the point of delivery of the solids withdrawn from near the outlet means to a point near the inlet means, means for aerating the liquid and purifying solids in the tank, means for controlling the concentration of purifying solids in the passages, and means for separating the purifying solids and purified liquid at the end of the process.

7. Apparatus for purifying liquid comprising a tank, partition means for dividing said tank into continuous flow passages, means for supplying unpurified liquid to the head end of the first passage, means for withdrawing liquid from the outlet end of the last passage, means for transporting purifying solids from a point near the outlet means to a point upstream in the tank, means for transporting purifying solids from a point downstream from the point of delivery of the solids withdrawn from near the outlet means to a point upstream in the tank, and other means for transporting purifying solids from a point in the tank which is downstream from a last-named point of delivery of purifying solids to a point in the tank which is upstream from a last-named point of delivery of purifying solids until a portion is returned to a point near the head end of the first passage, means for aerating the liquid and purifying solids in the tank, means for controlling the concentration of purifying solids in the passages, and means for separating the purifying solids and purified liquid at the end of the process.

8. Apparatus for purifying liquid comprising a tank, partition means for dividing said tank into continuous flow passages, means for supplying unpurified liquid to the head end of the first passage, means for withdrawing liquid from the outlet end of the last passage, means for transporting purifying solids from a point near the outlet means to a point upstream in the tank, means for transporting purifying solids from a point downstream from the point of delivery of the solids withdrawn from near the outlet means to a point near the inlet means, means for aerating the liquid and purifying solids, means for withdrawal of purifying solids from the tank to a place of final disposal, and means for controlling the concentration of purifying solids in the passages.

9. The improvement in the activated sludge process of treating sewage in an aerating tank of the continuous flow type, said improvement comprising transporting clarifying solids from a point near the effluent end of the tank to a point upstream in the tank, transporting clarifying solids from a point downstream from the point of delivery of the solids withdrawn from near the effluent end of the tank to a point near the influent end of the tank, aerating the sewage and clarifying solids in the tank, discharging a portion of the solids withdrawn from a point in the tank to waste, and discharging an effluent containing a low concentration of suspended solids.

10. The improvement in the activated sludge process of treating sewage in an aerating tank of the continuous flow type, said improvement comprising supplying air beneath the surface of the sewage, removing a portion of the contents of the tank from a point near the effluent end of the tank, transporting the removed portion to an upstream point in the tank, there returning the removed portion to the sewage flowing in the tank, removing a second portion of the contents of the tank from a point between the above-named removal point and the above-named return point, transporting this second removed portion to a point in the tank which is upstream with respect to the first-named return point, and continuing such procedure for removing a portion of the contents of the tank from a point between a last-named point of removal and a last-named return point, and transporting a last-named removed portion to a point in the tank which is upstream from a last-named return point until a portion is returned to the tank at a point near the influent end of the tank, discharging a portion of the solids withdrawn from a point in the tank to waste, and discharging an effluent containing a low concentration of suspended solids.

11. The improvement in the activated sludge process of treating sewage in an aerating tank of the continuous flow type, said improvement comprising supplying air beneath the surface of the sewage, removing a portion of the contents of the tank from a point near the effluent end of the tank, transporting the removed portion to an upstream point in the tank, there returning the removed portion to the sewage flowing in the tank, removing a second portion of the contents of the tank from a point between the above-named removal point and the above-named return point, transporting this second removed portion to a point in the tank which is upstream with respect to the first-named return point, and continuing such procedure for removing a portion of the contents of the tank from a point between a last-named point of removal and a last-named return point, and transporting a last-named removed portion to a point in the tank which is upstream from a last-named return point until a portion is returned to the tank at a point near the influent end of the tank, discharging an effluent containing solids in amount substantially equal to the solids received in the raw sewage, and separating the solids and clarified liquid at the end of the process.

12. Apparatus for purifying liquid comprising a tank, partition means for dividing said tank into continuous flow passages, means for supplying unpurified liquid to the head end of the first passage, means for withdrawing liquid from the outlet end of the last passage, means for transporting purifying solids from a point near the outlet means to a point upstream in the tank, means for transporting purifying solids from a point downstream from the point of delivery of the solids withdrawn from near the outlet means to a point upstream in the tank, and other means for transporting purifying solids from a point in the tank which is downstream from a last-named point of delivery of purifying solids to a point in the tank which is upstream from a last-named point of delivery of purifying solids until a portion is returned to a point near the head end of the first passage, means for aerating the liquid and purifying solids in the tank, means for withdrawal of purifying solids from the tank to a place of final disposal, and means for controlling the concentration of purifying solids in the passages.

13. Apparatus for purifying liquid comprising a tank, partition means for dividing said tank into continuous flow passages, means for supplying unpurified liquid to the head end of the first passage, means for withdrawing liquid from the outlet end of the last passage, means for transporting purifying solids from a point near the outlet end to a point upstream in the tank, means for transporting purifying solids from a point downstream from the point of delivery of the solids withdrawn from near the outlet end to a point near the inlet end, means for aerating the liquid and purifying solids in the tank, and means for controlling the concentration of purifying solids in the passages.

14. Apparatus for purifying liquid comprising a tank, partition means for dividing said tank into continuous flow passages, means for supplying unpurified liquid to the head end of the first passage, means for withdrawing liquid from the outlet end of the last passage, means for transporting purifying solids from a point near the outlet end to a point upstream in the tank, means for transporting purifying solids from a point downstream from the point of delivery of the solids withdrawn from near the outlet end to a point upstream in the tank, and other means for transporting purifying solids from a point in the tank which is downstream from a last-named point of delivery of purifying solids to a point in the tank which is upstream from a last-named point of delivery of purifying solids until a portion is returned to a point near the head end of the first passage, means for aerating the liquid and purifying solids in the tank, and means for controlling the concentration of purifying solids in the passages.

FREDERICK E. NUSSBERGER.

REFERENCES CITED

The following references are of record in the file of this patent:

UNITED STATES PATENTS

| Number | Name | Date |
| --- | --- | --- |
| 1,247,542 | Jones | Nov. 20, 1917 |
| 1,286,017 | Jones | Nov. 26, 1918 |
| 1,525,297 | Hartley et al. | Feb. 3, 1925 |
| 1,717,780 | Imhoff | June 18, 1929 |
| 1,902,078 | Jenks | Mar. 21, 1933 |
| 1,904,916 | Coombs | Apr. 18, 1933 |
| 2,048,640 | Sperry | July 21, 1936 |
| 2,118,266 | Nordell | May 24, 1938 |
| 2,337,384 | Gould | Dec. 21, 1943 |
| 2,394,413 | Walker | Feb. 5, 1946 |
| 2,419,492 | Green | Apr. 22, 1947 |

FOREIGN PATENTS

| Number | Country | Date |
| --- | --- | --- |
| 104,187 | Great Britain | Mar. 1, 1917 |
| 187,315 | Great Britain | Oct. 16, 1922 |